United States Patent
Dakshinamurthy et al.

(10) Patent No.: US 9,560,595 B2
(45) Date of Patent: Jan. 31, 2017

(54) DYNAMIC OPERATING BANDWIDTH CONFIGURATION FOR AN ENVELOPE TRACKER

(71) Applicant: Broadcom Corporation, Irvine, CA (US)

(72) Inventors: Sriraman Dakshinamurthy, San Jose, CA (US); Robert Gustav Lorenz, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 59 days.

(21) Appl. No.: 13/922,836

(22) Filed: Jun. 20, 2013

(65) Prior Publication Data

US 2014/0155116 A1  Jun. 5, 2014

Related U.S. Application Data

(60) Provisional application No. 61/804,863, filed on Mar. 25, 2013, provisional application No. 61/732,780, filed on Dec. 3, 2012.

(51) Int. Cl.
*H04W 52/02* (2009.01)

(52) U.S. Cl.
CPC ..... *H04W 52/0251* (2013.01); *H04W 52/0261* (2013.01); *Y02B 60/50* (2013.01)

(58) Field of Classification Search
CPC ................................................ H04W 52/0225
See application file for complete search history.

(56) References Cited

U.S. PATENT DOCUMENTS

| | | | |
|---|---|---|---|
| 6,310,866 B1 * | 10/2001 | Kronestedt | H04W 16/14 370/330 |
| 6,674,856 B1 | 1/2004 | Hendricks et al. | |
| 6,760,580 B2 * | 7/2004 | Robinson | H04L 51/04 455/412.2 |
| 7,482,869 B2 * | 1/2009 | Wilson | H03F 1/025 330/127 |
| 7,764,060 B2 | 7/2010 | Wilson | |
| 7,868,698 B2 | 1/2011 | Wilson | |
| 8,093,945 B2 | 1/2012 | Wimpenny | |

(Continued)

OTHER PUBLICATIONS

Behravan, Ali, et al., Adaptive Predistorter Design for Nonlinear High Power Amplifiers, Chalmers University of Technology, Göteborg, Sweden, 2003, 4 pages.

(Continued)

*Primary Examiner* — Bobbak Safaipour
(74) *Attorney, Agent, or Firm* — Brinks Gilson & Lione

(57) ABSTRACT

A communication device, such as a smart phone, receives operational parameters from a network controller. The operational parameters may include, as examples, bandwidth allocation, center frequency, and receive/transmit band assignments. The operational parameters (e.g., bandwidth allocation) may change on a subframe by subframe basis. In response to the operational parameters, the communication device determines a new configuration for an envelope tracking (ET) power supply. The communication device modifies the ET power supply to implement the new configuration. The new configuration may be chosen to adapt the ET power supply to meet the demands of the operation parameters, without excess power consumption.

20 Claims, 11 Drawing Sheets

(56) References Cited

U.S. PATENT DOCUMENTS

| | | | |
|---|---|---|---|
| 8,093,946 B2 | 1/2012 | Wimpenny et al. | |
| 8,093,979 B2 | 1/2012 | Wilson | |
| 8,106,713 B2 | 1/2012 | Wilson | |
| 8,169,261 B2 | 5/2012 | Wilson | |
| 8,294,522 B2 | 10/2012 | Flint et al. | |
| 8,319,570 B2 | 11/2012 | Wilson | |
| 8,942,652 B2* | 1/2015 | Khlat | H03F 1/0227 330/200 |
| 2003/0093327 A1* | 5/2003 | Roberts | G06Q 10/02 705/26.8 |
| 2003/0229900 A1* | 12/2003 | Reisman | G06F 17/30873 725/87 |
| 2004/0083291 A1* | 4/2004 | Pessi | H04L 65/605 709/227 |
| 2004/0141594 A1* | 7/2004 | Brunson | H04L 12/58 379/88.12 |
| 2004/0214576 A1* | 10/2004 | Myers | H04L 63/0272 455/445 |
| 2005/0033852 A1* | 2/2005 | Tenhunen | G06Q 10/107 709/229 |
| 2005/0114493 A1* | 5/2005 | Mandato | H04L 67/327 709/223 |
| 2005/0169446 A1* | 8/2005 | Randall | H04M 1/576 379/93.23 |
| 2005/0277406 A1* | 12/2005 | Diroo | H04M 3/42042 455/412.2 |
| 2005/0277431 A1* | 12/2005 | White | H04W 8/04 455/466 |
| 2006/0007899 A1* | 1/2006 | White | H04M 3/42042 370/338 |
| 2006/0145781 A1* | 7/2006 | Layne | H04B 1/0057 333/132 |
| 2009/0228890 A1* | 9/2009 | Vaitovirta | G06F 9/5027 718/104 |
| 2010/0036512 A1* | 2/2010 | Rutjes | H04L 12/282 700/90 |
| 2011/0102224 A1* | 5/2011 | Cathelin | H03F 3/2175 341/143 |
| 2012/0231858 A1* | 9/2012 | Hebbar | H04W 52/0251 455/574 |
| 2012/0270511 A1 | 10/2012 | Dakshinamurthy et al. | |
| 2014/0010179 A1* | 1/2014 | Lee | H04W 72/10 370/329 |
| 2014/0064405 A1* | 3/2014 | Shi | H04L 25/03828 375/297 |

OTHER PUBLICATIONS

Dahlman, Erik, et al., Key features of the LTE radio interface, Ericsson Review No. 2, 2008, 4 pages.

Le Gallou, Nicolas, et al., Over 10MHz Bandwidth Envelope-Tracking DC/DC converter for Flexible High Power GaN Amplifiers, 2011 IEEE MTT-S International Microwave Symposium, Baltimore, Maryland, 2011, 4 pages.

LTM 9003, 12-Bit Digital Pre-Distortion μModule Receiver Subsystem, Linear Technology Corporation, Milpitas, California, downloaded May 2013, 24 pages.

Schow, C.L., et al., Transmitter Pre-Distortion for Simultaneous Improvements in Bit-Rate, Sensitivity, Jitter, and Power Efficiency in 20 Gb/s CMOS-driven VCSEL Links, Optical Society of America, 2011, 3 pages.

Basic PA Linearization Concepts: Predistortion Techniques vs. Operation in Backoff, Scintera Networks, Inc., 2009-2011, 3 pages.

Seydou, N., Efficient Digital Baseband Predistortion for Modern Wireless Handsets, Georgia Institute of Technology, Dec. 2009, 133 pages.

GC5322, Wideband Digital Pre-Distortion Transmit IC Solution, Texas Instruments Incorporated, 2008, 4 pages.

GC5325, Wideband Digital Predistortion Transmit Processor, Texas Instruments Incorporated, 2009, 24 pages.

GC5328, Low-Power Wideband Digital Predistortion Transmit Processor, Texas Instruments Incorporated, 2009, 27 pages.

Verfaillie, G., White paper Equalising and Predistortion: The Equalink™ concept, Newtec Cy N.V., 2008, 8 pages.

* cited by examiner

DYNAMIC OPERATING BANDWIDTH CONFIGURATION FOR AN ENVELOPE TRACKER

CROSS REFERENCE TO RELATED APPLICATIONS

This application claims priority to U.S. Provisional Application Ser. No. 61/732,780, filed 3-Dec.-2012, which is incorporated by reference in its entirety. This application also claims priority to, and incorporates by reference, U.S. Provisional Application Ser. No. 61/804,863, filed 25-Mar.-2013.

TECHNICAL FIELD

This disclosure relates to signal transmission. This disclosure also relates to the transmit circuitry in user equipment such as cellular telephones and other devices.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Furthermore, past estimates have indicated that (as just three examples) the United States, Italy, and the UK have more mobile phones in use in each country than there are people even living in those countries. Improvements in wireless communication devices, particularly in their ability to reduce power consumption, will help continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
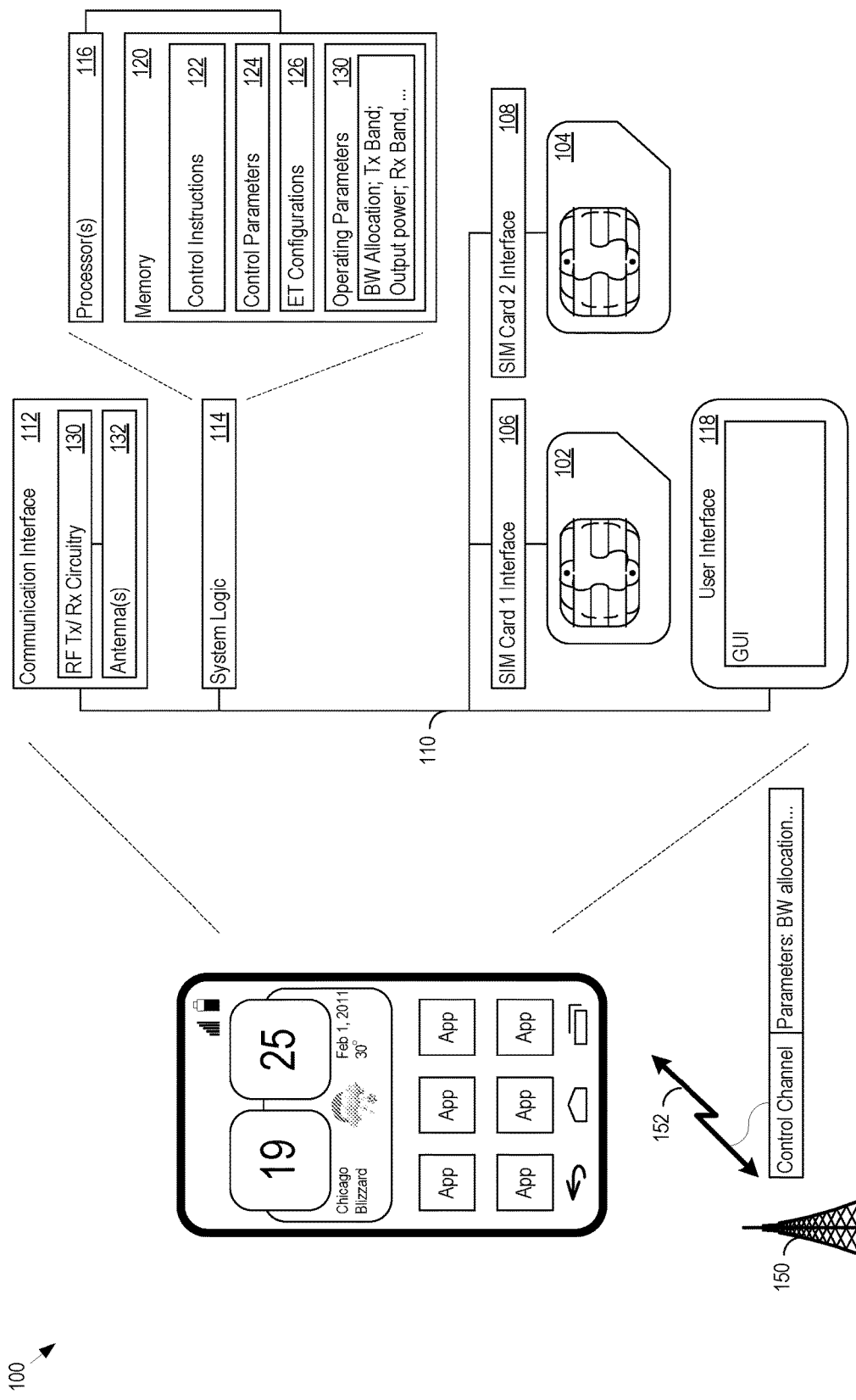
FIG. 1 shows an example of user equipment that includes a transmit and receive section.

The discussion below makes reference to user equipment. User equipment may take many different forms and have many different functions. As one example, user equipment may be a 2G, 3G, or 4G/LTE cellular phone capable of making and receiving wireless phone calls, and transmitting and receiving data. The user equipment may also be a smartphone that, in addition to making and receiving phone calls, runs any number or type of applications. User equipment may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in a base station or other network controller that communicates with the user equipment.

As an introduction to the techniques, before turning to the Figures, the user equipment (UE) may include a memory that stores multiple different power supply configurations. A controller in the UE is in communication with the memory and a power supply communication interface. The controller determines a performance requirement for the system for communicating information. The controller then determines, responsive to the performance requirement, a selected power supply configuration from among those available. The controller also communicates the selected power supply configuration over the power supply communication interface. Alternatively, the controller may preprogram the power supply with a set of configurations that the power supply stores in shadow registers, for example. The controller may then command the power supply to switch to a particular configuration stored in a shadow register, responsive to the performance requirement.

The performance requirement may be, as just one example, a transmit channel bandwidth. The controller may then determine the selected power supply configuration by determining which of the power supply configurations is most energy efficient for the specified transmit channel bandwidth. The power supply may be an envelope tracking power supply, and the power supply configuration may alter: one or more switching frequencies within the power supply, gain-bandwidth products of the circuitry in the power supply, bias currents, or other operating parameters of the power supply.

In some implementations, the selected power supply configuration specifies operating parameters for an envelope tracking power supply. The operating parameters may cause the envelope tracking power supply to operate as a function of the performance requirement (e.g., any of the transmit band, bandwidth, or output power). In other words, the characteristics of the power supply output signal of the envelope tracking power supply will be responsive to the performance requirements. The performance requirements may originate from a network controller that sends the performance requirements to the UE over a control channel, or in other ways.

Further, in some implementations, the UE may take into consideration the proximity of other communication bands in making the determination as to how to configure the envelope tracking power supply. For example, consider the case where the network controller has specified a particular transmit band for the UE. The transmit band may be near (e.g., within a predefined distance threshold) a particular receive band (e.g., a public safety band). In that case, the controller in the UE may reconfigure the envelope tracking power supply to provide excess capability (e.g., by running at a higher switching frequency or providing additional bias current) for transmitting in the transmit band. The excess capability may minimize or eliminate distortion products or other interference that the transmissions might otherwise generate in the nearby receive band, and therefore also help to avoid potentially desensitizing the receiver in the receive band.

FIG. 1 shows an example of user equipment (UE) 100 in communication with a network controller 150, such as an enhanced Node B (eNB) or other base station. In this example, the UE 100 supports one or more Subscriber Identity Modules (SIMs), such as the SIM1 102 and the SIM2 104. An electrical and physical interface 106 connects SIM1 102 to the rest of the user equipment hardware, for example, through the system bus 110. Similarly, the electrical and physical interface 108 connects the SIM2 to the system bus 110.

The user equipment 100 includes a communication interface 112, system logic 114, and a user interface 118. The system logic 114 may include hardware, software, firmware, or other logic in any combination. The system logic 114 may be implemented, for example, in a system on a chip (SoC), one or more application specific integrated circuits (ASICs), or with other circuitry. The system logic 114 is part of the implementation of any desired functionality in the UE 100. In that regard, the system logic 114 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 may include a graphical user interface, touch sensitive display, voice or facial recognition inputs, buttons, switches, speakers and other user interface elements.

In the communication interface 112, Radio Frequency (RF) transmit (Tx) and receive (Rx) circuitry 130 handles transmission and reception of signals through the antenna(s) 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, pre-amplifiers, power amplifiers and/or other logic for transmitting and receiving through one or more antennas, or through a physical (e.g., wireline) medium.

As one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the user equipment 100, are available from Broadcom Corporation of Irvine Calif.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 112 may support transmission and reception under the 4G/Long Term Evolution (LTE) standards. The techniques described below, however, are applicable to other communications technologies whether arising from the 3rd Generation Partnership Project (3GPP), GSM (R) Association, Universal Mobile Telecommunications System (UMTS), High Speed Packet Access (HSPA)+, or other partnerships or standards bodies.

The system logic 114 may include one or more processors 116 and memories 120. The memory 120 stores, for example, control instructions 122 that the processor 116 executes to carry out any of the processing or control functionality described below, operating in communication with the logic in the communication interface 112. For example, the system logic 114 may reprogram, adapt, or modify parameters or operational characteristics of the logic in the communication interface 112. The system logic 114 may make adaptations to, as a specific example, the configuration of an envelope tracking power supply.

The control parameters 124 provide and specify configuration and operating options for the control instructions 122. As will be explained in more detail below, the memory 120 may also store a library of ET configurations 126 (e.g., power supply configuration parameter data sets), as well as operating parameters 130 received from the network controller 150. The operating parameters 130 may include bandwidth allocation, center frequency, transmit band, receive band, output power, or any other operating parameter for the UE 100. The system logic 114 in the UE 100 may reprogram a power supply in the communication interface 112 with a particular configuration data set from the library in response to any performance requirement of the UE 100, including the operating parameters 130 and changes to the operating parameters 130. In other implementations, the system logic 114 may preprogram different configuration parameter data sets into the power supply, for example into different sets of registers in the power supply. Then system logic 114 may then issue a command to the power supply over a communication interface to cause the power supply to switch to a particular preconfigured set of configuration parameters that are suitable for the performance requirement.

As noted above, the UE 100 is in communication with the network controller 150 over one or more control channels 152. The network controller 150 sends messages to the UE 100 over the control channels 152. The messages may include, specify, or determine the operating parameters 130, such as power control parameters, bandwidth allocation parameters, and other operating parameters. The UE 100 may respond to messages that include such operating parameters by determining whether to reconfigure the power supply, and if so, carrying out the reconfiguration to meet a particular goal, such as reducing energy consumption while meeting the performance requirement.

Figure 2:
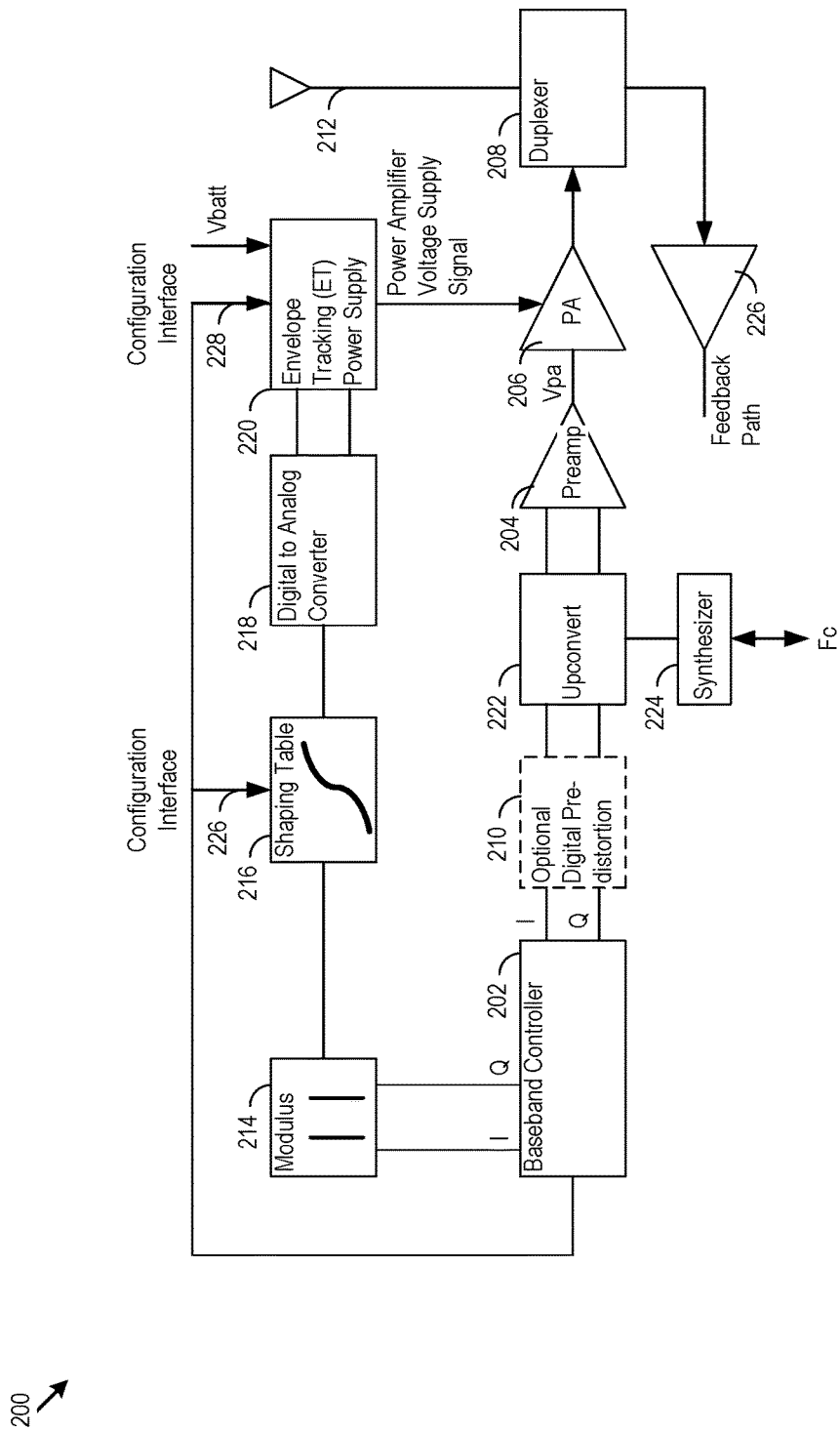
FIG. 2 is an example of a transmit and receive section.

FIG. 2 shows an example of a transmit/receive logic 200 that may be present in the user equipment 100. The logic 200 may include a baseband controller, RF IC, power amplifier, and envelope tracking power supply, and other circuitry. Accordingly, the chain 200 may span portions of the Tx/Rx circuitry 130 and the system logic 114.

The logic 200 shown in FIG. 2 includes a baseband controller 202, a preamplifier 204, a power amplifier (PA) 206, and a duplexer 208. Pre-distortion logic 210 is optionally present, and may modify the input signal samples from the baseband controller prior to generation of the preamplifier output signal to the PA 206. An upconversion section 222 prepares the input signal samples for transmission. The upconversion section 222 may center the signal to be transmitted at a particular center frequency Fc. Different center frequencies for transmitting and for receiving may be specified over the control channel 152 by the network controller 150 (for example), and may be internally generated by a frequency synthesizer 224 for upconversion and downconversion in the logic 200. The upconversion section 222 may implement a processing flow for the input signal samples that includes, as examples, a pre-emphasis or baseband gain stage, I and Q DACs, analog filters, and mixers for upconversion to Fc. Pre-amplification by the pre-amplification stage 204, and power amplification by the PA 206 may follow.

The duplexer 208 may implement a transmit/receive switch under control of the system logic 114. In one switch position, the duplexer 208 passes amplified transmit signals through the antenna 212. In a different switch position, the duplexer 208 passes received signals from the antenna 212 to the feedback path 226.

The baseband controller 202 may be part of the system logic 114 and provides, e.g., inphase/quadrature (I/Q) input signal samples to the modulus logic 214. The modulus logic 214 may output the absolute value (e.g., the square root of I squared plus q squared) of the input signal to a shaping table 216. The shaping table 216 maps input values to output values in a linear or non-linear manner. The output of the shaping table 216 feeds the digital to analog converter (DAC) 218. In turn, the DAC 218 outputs the envelope of the input signal as modified by the shaping table to the envelope tracking (ET) power supply 220. Said another way, the shaping table 216 implements a non-linear mapping between the modulus of the signal to be transmitted and the voltage that appears at the output of the DAC 218, to which the ET switcher is responsive.

The shaping table 216 may be implemented in many ways. For example, the shaping table may be a lookup table implemented in software or hardware. The shaping table 216 may include, for instance, 64 or 128 table data set values that map input signal values to output signal values. The shaping table implementation may perform linear or non-linear interpolation between specific data set values, for any input signal value that does not exactly correspond to one of the sample points having a specific data set value in the shaping table 216. In other implementations, the shaping table 216 may be implemented as program instructions that calculate the output value as a function of input signal value according to any desired input to output relationship curve.

Configuration interfaces 226 and 228, e.g., serial or parallel data interfaces, control pins, or other interfaces, may be provided to configure the shaping table 216 and ET 220, or other parts of the user equipment 100. The configuration interfaces 226 and 228 may be MIPI Alliance specified interfaces or other types of interfaces.

An envelope tracking (ET) power supply 220 receives the envelope signal from the DAC 218. The ET 220 may output a PA power supply voltage signal that follows the envelope signal, plus a preconfigured amount of headroom. The PA power supply voltage signal provides power to the PA 206 for driving the antenna 212 with the transmit signal.

The logic 200 may support a wide range of output powers. The output power employed at any particular time may be specified by the network controller 150, for example. In some implementations, the logic 200 may generate output powers at the antenna 212 of 23 dBm. As noted above, the duplexer 208 may separate the transmit path and receive path, and in doing so introduces some power loss, typically on the order of 3 dBm. Thus, to achieve 23 dBm output power at the antenna 212, the PA 206 produces approximately a 26 dBm signal. Doing so, however, consumes a significant amount of power due to inefficiencies in the components of the logic 200. In particular, the PA 206 itself may be on the order of 40% efficient. Given these losses, certain techniques are described below that result in significant power savings for the device 100.

Specifically, the logic 200 may implement reprogramming of the ET power supply 220 in response to particular performance requirements. The reprogramming carried out, e.g., changing a switching frequency within the ET power supply 220, may vary according to the performance requirements specified for the device 100 by the network controller 150, or according to other operational parameters. The performance requirements may include, as examples, bandwidth allocation, output power, transmit band, receive band, center frequency, or other performance requirements. The configuration of the ET power supply 220 may further be a function of the relationship of the performance requirements to one another. For example, the separation or proximity of a transmit band to a receive band may influence the way in which the system logic 114 configures ET power supply 220. Said another way, the logic 200 may reconfigure the ET power supply 220 as a function of performance requirements and their relationships, which may change on a subframe-by-subframe basis. The frames and subframes may be, as examples, LTE frames (e.g., 10 ms frames) and subframes (e.g., 1 ms subframes). The adaptation of the ET power supply 220 may result in significant power savings for the reasons described below.

Figure 3:
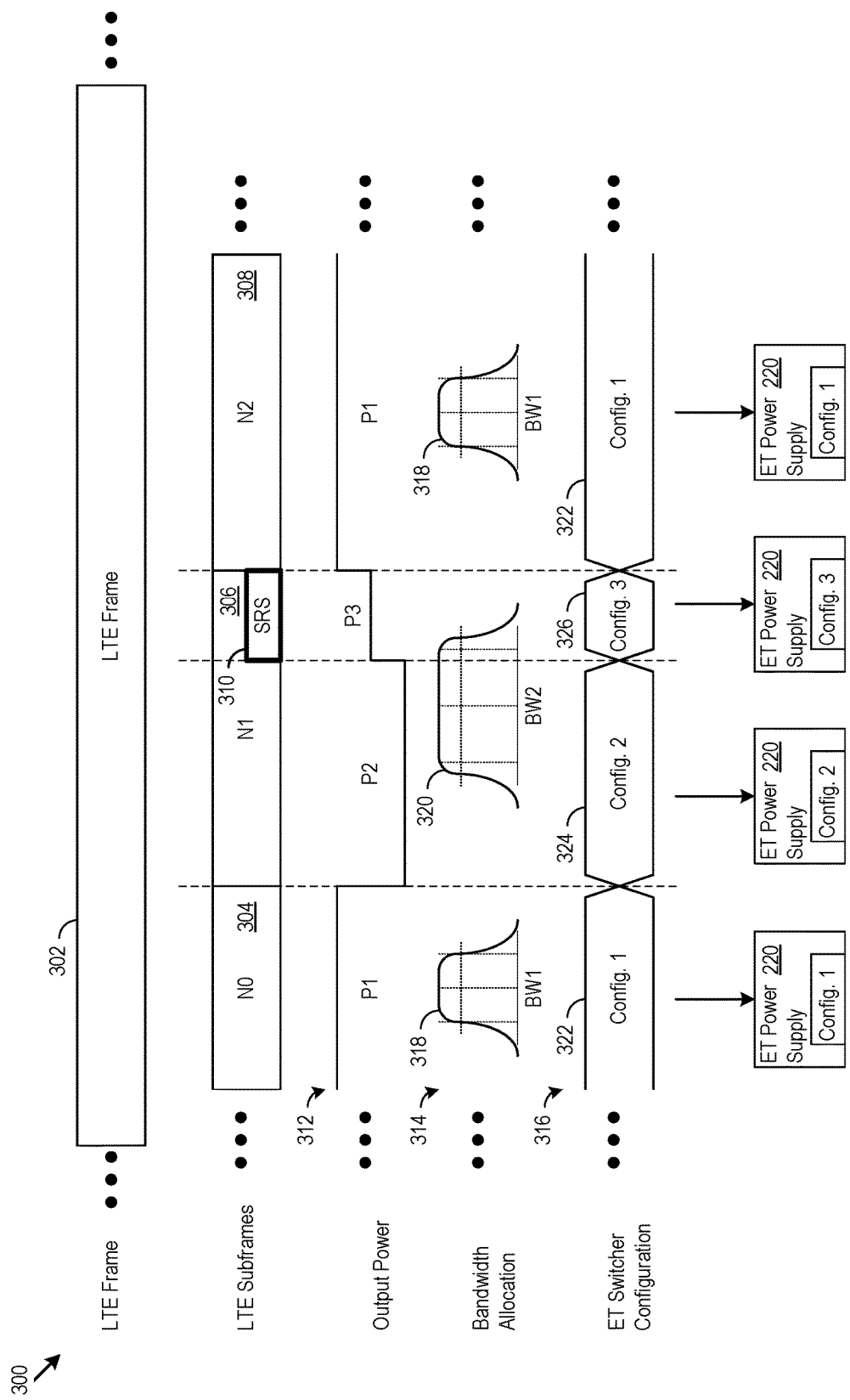
FIG. 3 shows examples of user equipment performance requirements for which a power supply may be reconfigured.

FIG. 3 shows examples of performance requirement changes 300 in response to which the UE 100 may reconfigure the ET power supply 220. The examples in FIG. 3 are in the context of an LTE system, but the performance requirements may be applicable in any of wide range of communication systems and protocols. FIG. 3 shows an LTE frame 302 and several 1 ms subframes of the LTE frame 302. The subframes shown in FIG. 3 include the subframe 304, 306, and 308. Further, subframe 306 includes a Sounding Reference Symbol (SRS) 310 that the UE will transmit to the network controller 150.

FIG. 3 also shows how the UE 100 may adapt its output power 312 in response to communication events that are, in this example the occurrence of subframe and symbol boundaries. In particular, FIG. 3 shows that the UE 100 is at power P1 during subframe 304, then switches to output power P2 for subframe 306. Further, within subframe 306, the UE 100 switches to output power P3 for the SRS 310, and then returns to output power P1 for the subframe 308.

The UE 100 switches its output power by configuring one or more functional blocks in the logic 200. For example, the UE 100 may adjust the gain of the preamplifier 204 or logic associated with the RF IC, may apply gain to the digital signal samples (e.g., by digital pre-distortion 212), or in other ways. The net result is that the UE 100 applies to the antenna 212 a transmit signal with the required output power.

In addition to the output power, another performance requirement that FIG. 3 illustrates is the bandwidth allocation 314. During the subframe 304 and the subframe 308, the UE 100 has the same bandwidth allocation 318. During the subframe 306, the UE 100 has the bandwidth allocation 320. Each bandwidth allocation may specify, among other variables, a center frequency and a bandwidth around the center frequency. These parameters may determine the transmit band in which the UE 100 transmits information. The network controller 150 may allocate the transmit band to the UE 100 for transmitting in accordance with bands defined in any particular communication standard, such as the time division duplexing (TDD) or frequency division duplexing (FDD) LTE bands. Furthermore, the bandwidth allocation may change on a subframe-by-subframe basis.

The ET power supply 220 produces a power amplifier voltage supply signal that approximates the envelope of the RF signal input to the ET power supply 220. To accurately match the envelope of the RF signal input, it would not be uncommon for the ET power supply 220 to operate at a bandwidth of 2, 3, or more times the instantaneous RF signal input bandwidth. Doing so means a certain amount of energy consumption, which generally increases as the operating bandwidth increases, in part due to increased parasitic switching losses. One approach to the design of the ET power supply 220 is to design it in a static manner so that it always runs in a mode that can handle a worst case scenario RF input signal bandwidth. However, when the bandwidth allocation to the UE 100 is not the worst case scenario, then the ET power supply 220 may be consuming more energy than required to reproduce the envelope of the RF signal input with sufficient accuracy that results in meeting, for example, limits on distortion products, adjacent channel interference, spectral masks, and other quality goals.

For these reasons and others, the system logic 114 may dynamically reconfigure the ET power supply 220 while in operation, and after any coarse settings have been set initially in the ET power supply 220 to handle, e.g., 3G or 4G communications in general. The ET configurations 126 may specify fine grained operating parameters and settings for the ET power supply 220. As examples, the operating parameters may specify the switching frequency, bandwidth, current, drive strength, supply voltages, quiescent current, linearity, maximum slew rate, or any other parameter of a switch mode converter, linear regulator, error feedback circuit (e.g., error amplifiers), or any other components in the ET power supply 220 that work to reproduce the envelope of the RF signal input in the power amplifier voltage supply signal. As another example, the operating parameters may specify increased or decreased quiescent operating currents through different circuits in the ET power supply 220. As a further example, the operating parameters may specify output stage current. Better linearity at the output may often result from providing additional output stage current to help the ET power supply 220 slew the typically large capacitances that it must drive.

Continuing the example in FIG. 3, the system logic 114 responds to the performance requirements of the UE 100 by determining whether and when to reconfigure the ET power supply 220. Broadly speaking, the system logic 114 may reconfigure the ET power supply 220 to meet the performance requirements, without consuming excess energy (e.g., by always running in a worst-case mode). As one example, when the bandwidth allocation becomes smaller, the system logic 114 may reconfigure the ET power supply 220 to save power by running any internal circuitry at a lower switching frequency, configuring the circuitry to achieve a lower gain-bandwidth product, or reducing output stage currents in a manner that reduces output linearity.

The system logic 114 may carry out the reconfiguration when a particular reconfiguration goal would be met. The reconfiguration goal may be reduced energy consumption that exceeds a reconfiguration threshold amount of energy consumption, as just one example. Other reconfiguration goals may be implemented.

In the example shown in FIG. 3, the system logic 114 determines that for the bandwidth allocations 318, the ET configuration 322 is suitable. The system logic 114 has also determined that for the bandwidth allocation 320, the ET configuration 324 is applicable at the power level P2, and that the ET configuration 326 is applicable at the power level P3. Note that the system logic 114 may make decisions concerning the ET configuration based on performance requirements in any combination, e.g., based on allocated transmit band, output power, proximity to a receive band, center frequency, or any other performance requirement alone or in combination.

Figure 4:
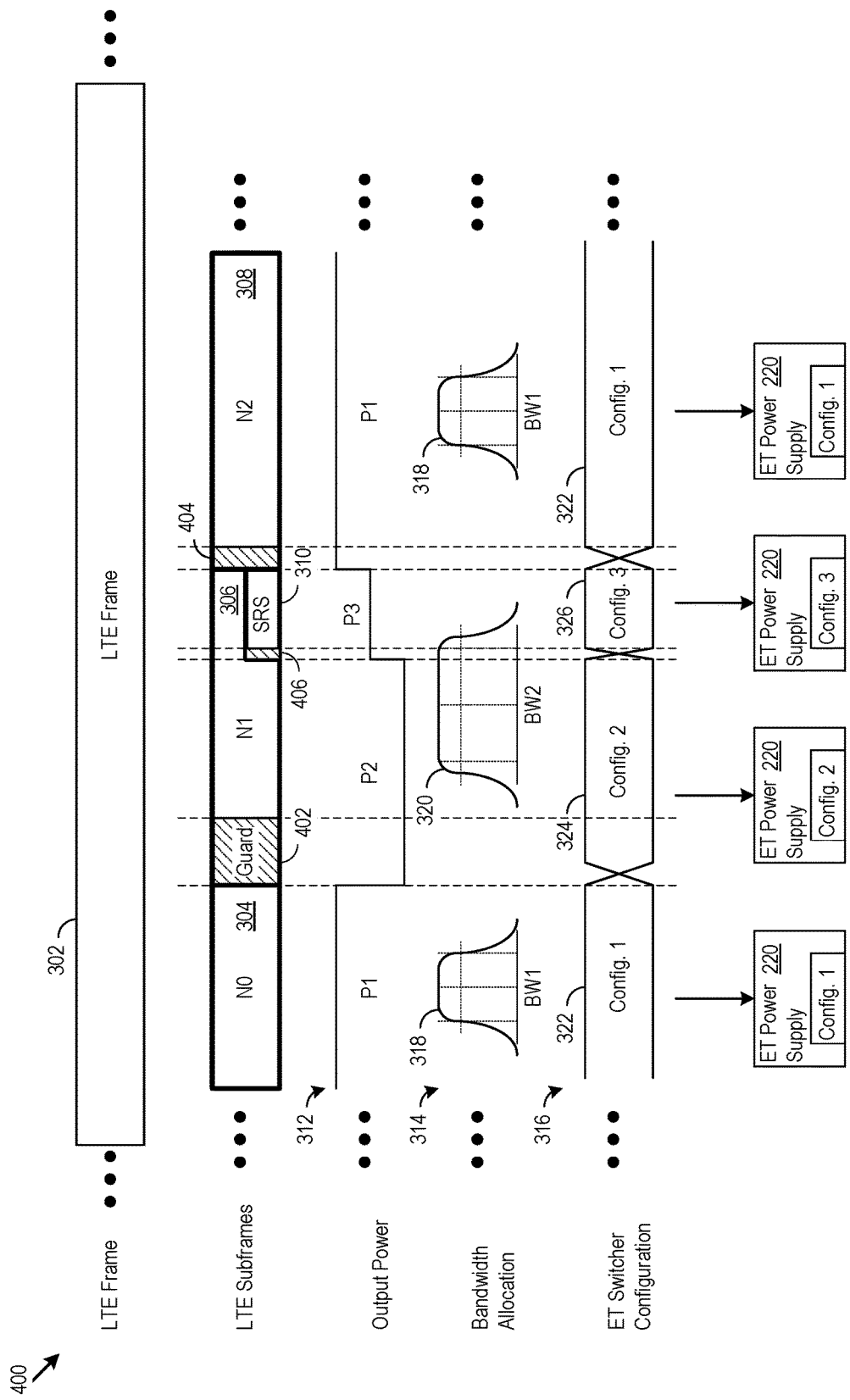
FIG. 4 shows a timing example of modifying the configuration of a power supply.

FIG. 4 shows a timing example 400 for modifying the configuration of a power supply. FIG. 4, follows the example of FIG. 3, but also shows that in certain situations, guard time may be present in the transmitted signals. For example, guard time (e.g., the guard time 402) may be present at the beginning of a subframe (e.g., the subframe 306). The system logic 114 may coordinate the change to the ET power supply configuration during the guard time. This may help to reduce or eliminate the effects of configuration transition glitches in the operation of the power supply on the power supply output voltage, and the transmitted signal.

FIG. 4 shows that guard time may be present at the beginning of a subframe. As examples, FIG. 4 shows the guard time 402 and 404. Guard time may instead be present at the end of a subframe, and the power supply reconfiguration may occur then as well. Guard time may be the time during which a cyclic prefix is transmitted, as one example.

There may also be guard time added before or as the leading portion of particular symbols (or of every symbol). One example is the guard time 406 that precedes the SRS 310. As shown in FIG. 4, the system logic 114 has coordinated the power supply reconfiguration for the ET configuration 326 to happen within the guard time 406. One benefit of having the system logic 114 coordinate reconfiguration of the power supply is that the system logic 114 (and in particular the baseband controller 202) typically has extremely accurate, sample by sample, intelligence and control of timing and the subframe and symbol structure, and may therefore be well suited to carrying out reconfiguration to meet timing constraints such as the guard times.

Figure 5:
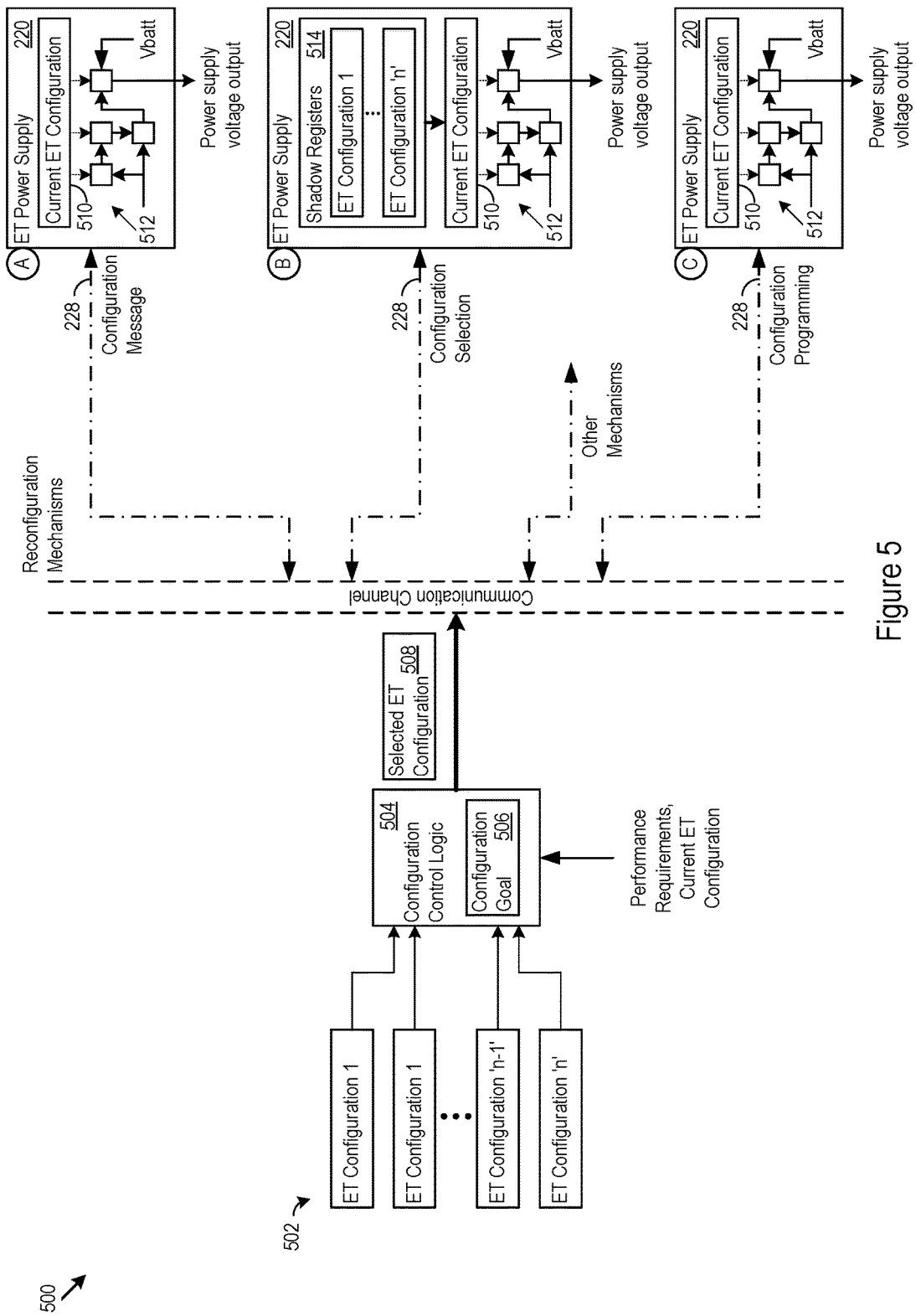
FIG. 5 shows examples of mechanisms for modifying the configuration of a power supply.

FIG. 5 shows examples 500 of how the UE 100 may accomplish reconfiguration of the ET power supply 220. A library 502 of ET configurations is present and stored, for example, in the memory 120. The configuration control logic 504 considers upcoming performance requirements of the UE 100, the current ET power supply configuration, and possibly other parameters to make a decision concerning whether to reconfigure the ET power supply 220. The configuration control logic 504 may be implemented in any combination of hardware and software, including as the control instructions 122 that are executed by the processor 116. The configuration control logic 504 may know the current ET configuration by tracking the configuration changes that it makes to the ET power supply 220, by sending a configuration request message to the ET power supply 220 and receiving a response specifying the configuration, by reading registers or other memory space in the ET power supply 220, or in other manners.

In particular, the configuration control logic 504 may determine whether any of the ET configurations in the library 502 would result in meeting a configuration goal 506. As mentioned above, the configuration goal may be achieving more than a threshold amount of reduced energy consumption compared to the current ET configuration. Thus, the configuration control logic 504 may determine, as a selected ET configuration 508, an ET configuration from the library 502 that meets the configuration goal. In other implementations, the configuration control logic 504 may index a search space of ET configurations with the performance requirements to locate an ET configuration suitable for the performance requirements, with or without reference to any particular performance goal.

Figure 8:
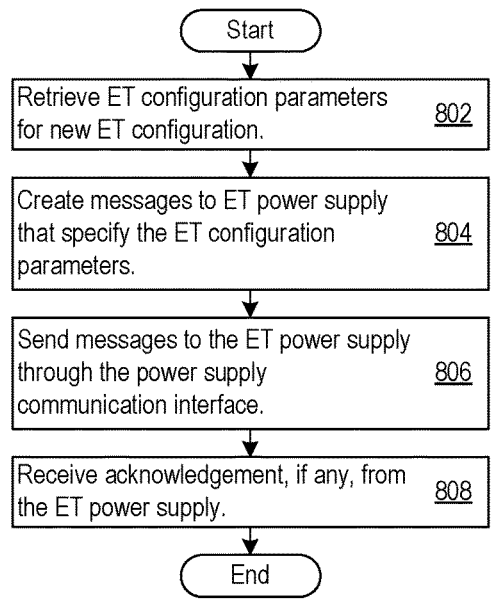
FIGS. 8-10 show examples of updating a power supply configuration.
Figure 9:
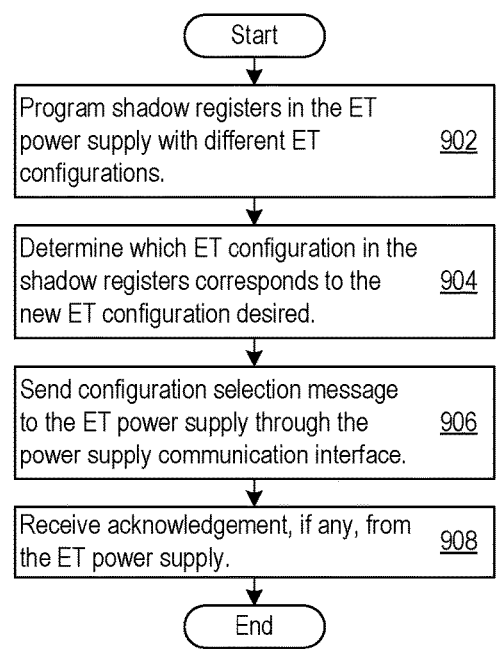
Figure 10:
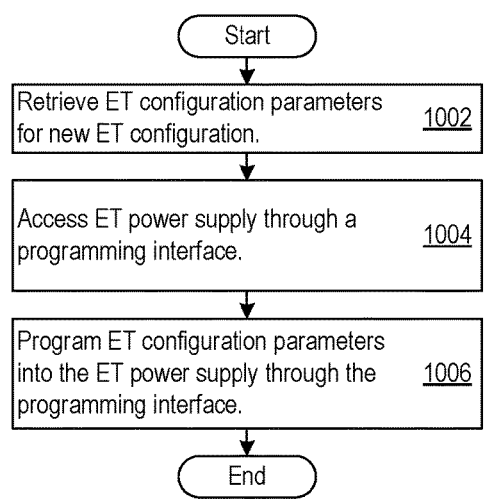

FIG. 5 shows several options for configuring the ET power supply 220, and many others may be implemented as well. The options illustrated in FIG. 5 are discussed in connection with FIGS. 8-10, which show examples of logic 800, 900, 1000 that the UE 100 may implement to update a power supply configuration.

In option A, the configuration control logic 504 retrieves ET configuration parameters for a new ET configuration (802). The configuration control logic 504 then creates on or more configuration messages that specify the new ET configuration parameters (804), and communicates the configuration message(s) to the ET power supply 220 (806). The configuration message may pass over the configuration interface 228, for example, and the ET power supply 220 optionally responds with an acknowledgement message (808).

The configuration message(s) may, for example, specify the selected ET configuration 508, by specifying the configuration parameters that constitute the selected ET configuration 508. Message receiving logic in the ET power supply 220 may then receive the configuration message, obtain the configuration parameters from the configuration message, and set the configuration parameters as the current ET configuration 510. The current ET configuration 510 is applied to the ET circuitry 512 (e.g., by selecting a switching clock speed) to implement the selected ET configuration 508.

In option B, the ET power supply 220 includes a set of shadow registers 514, or other memory space for storing configuration parameters. The shadow registers 514 may store any number of ET configurations. The configuration control logic 504 may communicate via messages, by writing directly into memory in the ET power supply 220, or otherwise preprogram one or more of the ET configuration parameter sets in the ET power supply 220 at any time (902). Further, the configuration control logic 504 may dynamically modify the ET configuration parameter sets during operation of the UE 100. The ET configuration parameter sets may be received over the control channel 152 from the network controller 150.

Having the ET configurations available in the ET power supply 220 facilitates changing the ET power supply configuration. As explained above, the configuration control logic 504 determines which ET configuration in the shadow registers corresponds to the new ET configuration desired, responsive to the performance requirements specified for the UE 100 (904). The configuration control logic 504 may then reconfigure the ET power supply 220 by sending a configuration selection message over the configuration interface 228 to the ET power supply 220 (906). The configuration selection message may specify, e.g., by number, which ET configuration in the shadow registers 514 the ET power supply 220 should make the current ET configuration 510. The ET power supply 200 optionally returns an acknowledgement message (908).

In option C, the configuration control logic 504 programs the ET power supply 220. For example, the configuration control logic 504 may retrieve the new ET configuration parameters (1002), and write the new configuration parameter values into the current ET configuration 510. In one implementation, the configuration control logic 504 may directly set the selected ET configuration 508 by accessing a programming interface to the ET power supply 220 (1004), and, e.g., writing to a memory space that corresponds to the current ET configuration 510 (1006).

Figure 6:
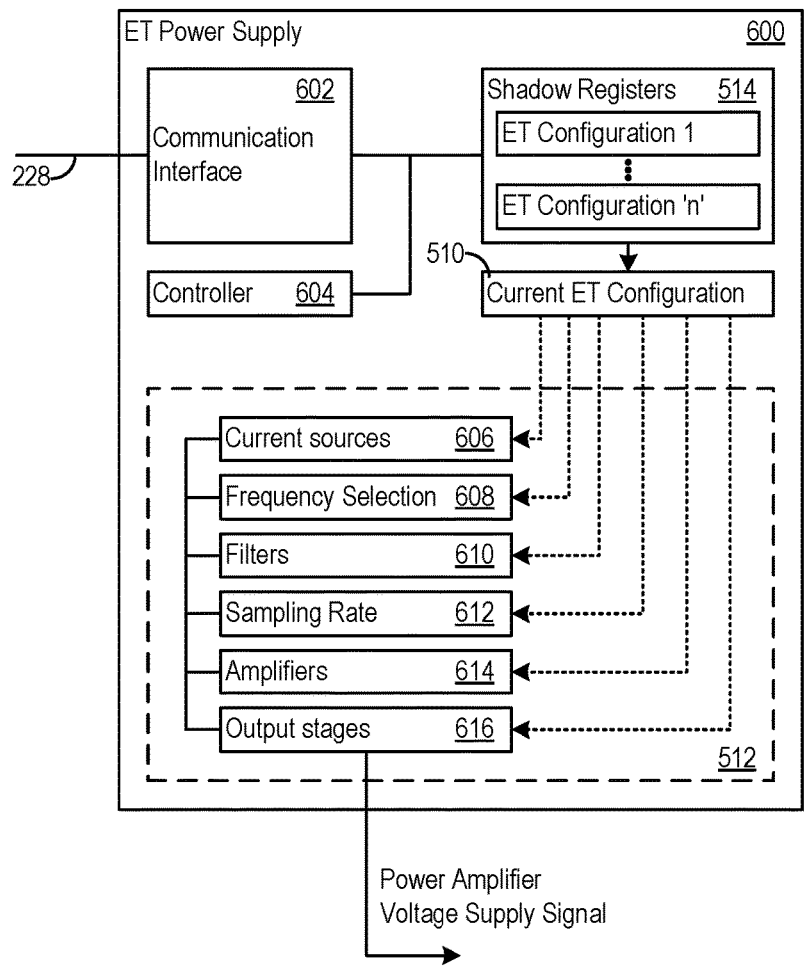
FIG. 6 shows an example of an ET power supply.

FIG. 6 shows an example of a reconfigurable ET power supply 600, which may be reconfigured according to any of the examples shown in FIG. 5, or in other ways. The ET power supply 600 includes a communication interface 602 (e.g., a MIPI interface), and a controller 604. The controller 604 may receive messages over the communication interface, and, as one example, save ET configurations in the shadow registers 514 and select a configuration to apply to the ET circuitry 512.

The ET circuitry 512 may include a wide range of configurable circuitry. Some examples are shown in FIG. 6. In particular, the configurable circuitry may include current sources 606, voltage controlled oscillators 608, and filters and mixers 610. Additional examples include sampling circuitry 612, error amplifiers 614 (such as an error amplifier or a linear amplifier), and output stages 616. For any of the circuitry 512, the configuration may change current draw, switching or clock frequencies, quiescent currents, operational bandwidth, or any other aspect of the circuitry.

Figure 7:
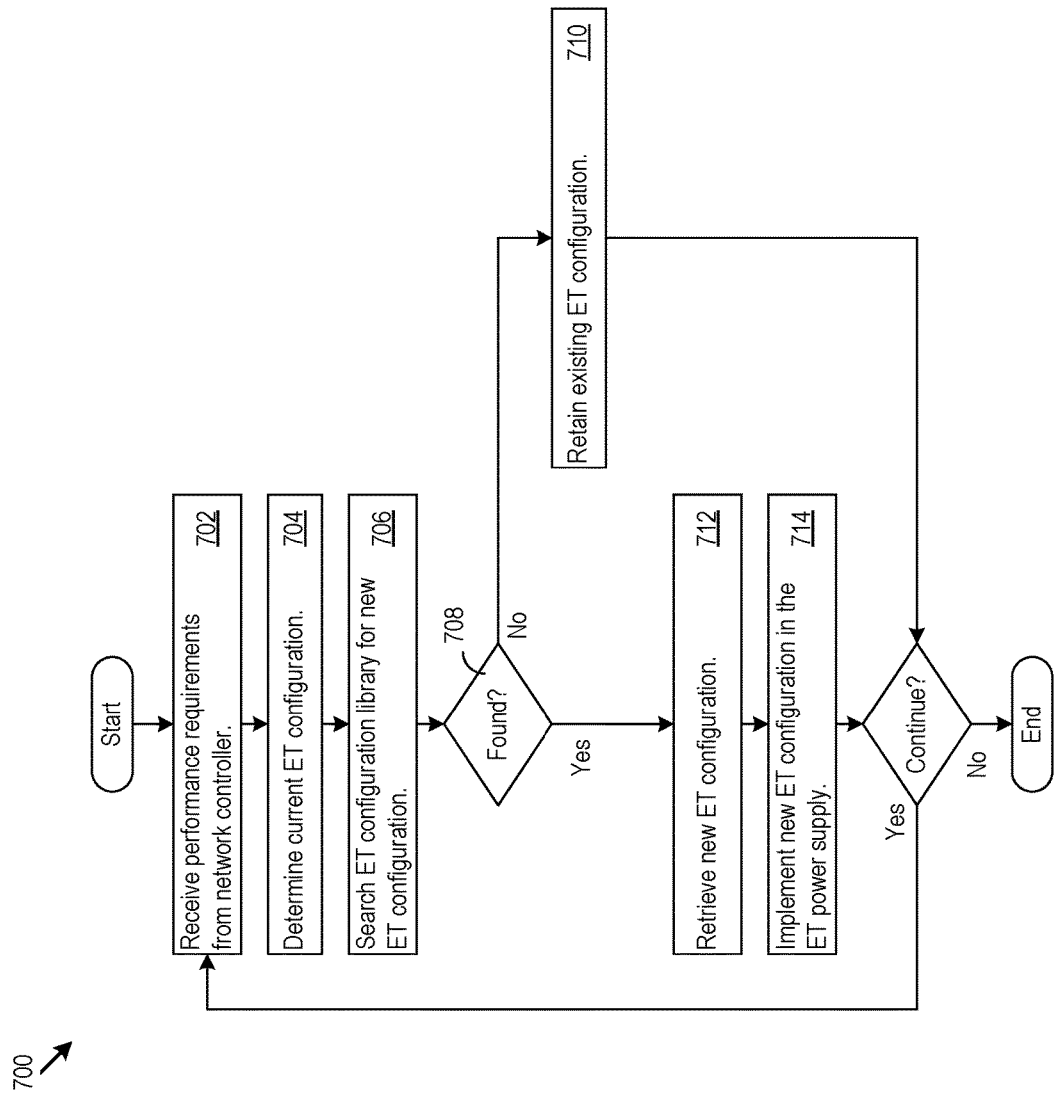
FIG. 7 shows an example of logic for reconfiguring a power supply due to user equipment performance requirements.

FIG. 7 shows an example of logic 700 for reconfiguring a power supply due to user equipment performance requirements. The logic 700 may be implemented in one or more software layers in the UE 100, in hardware or software, for example as part of the control instructions 122. The logic 700 receives performance requirements for the UE 100 from, e.g., the network controller 150, or from other sources, such as user input (702). The logic 700 also determines the current configuration of the ET power supply 220 (704). The logic 700 may obtain the current configuration by reading a memory spaced mapped to the ET power supply configurations, by requesting the ET configuration from the ET power supply 220, by tracking the changes made over time to the ET power supply 220, or in other ways.

Given the current configuration, the logic 700 searches a library of ET configurations for a new ET configuration applicable to the performance requirements (706). If no new ET configuration is found (708), then the logic 700 retains the existing ET configuration (710). Otherwise, the logic 700 retrieves the new ET configuration (712) and implements the new ET configuration in the ET power supply 220 (714). FIGS. 5 and 8-10, described above, explain several options for performing the reconfiguration.

Figure 11:
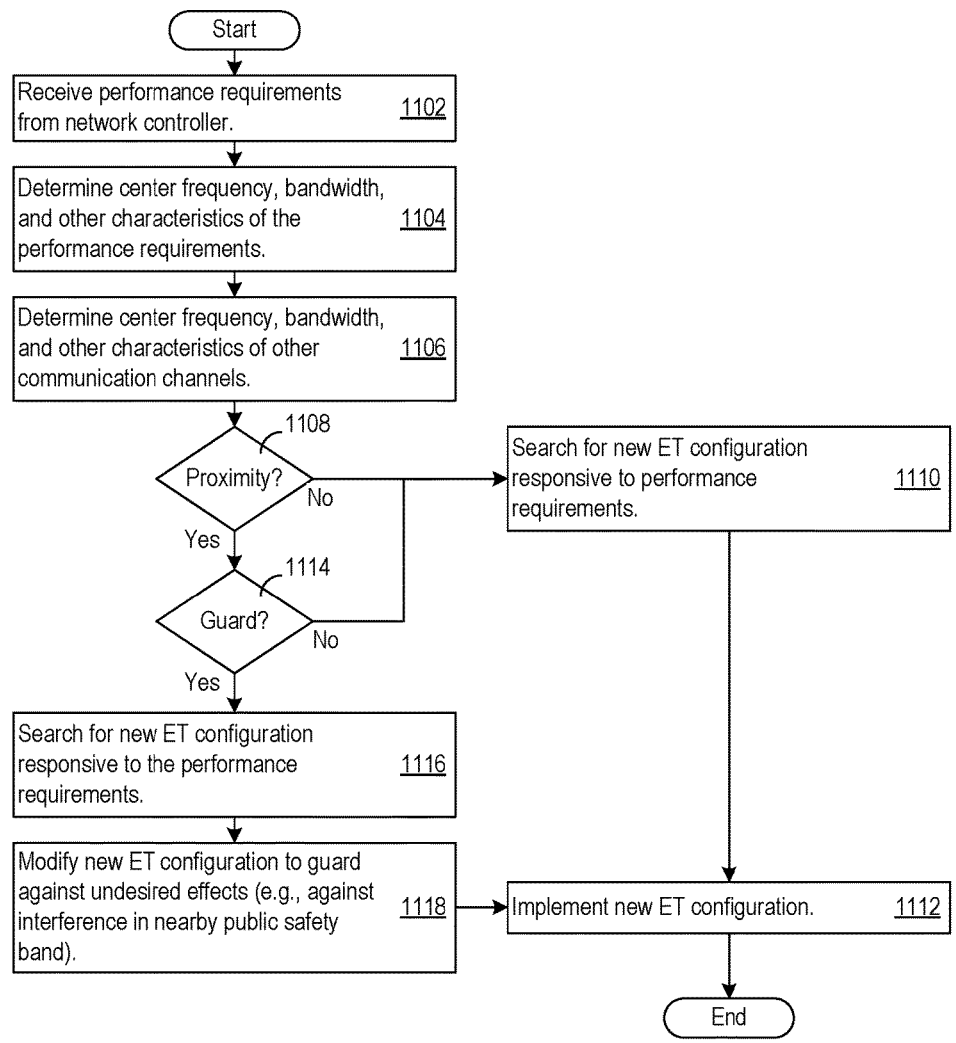
FIG. 11 shows an example of logic for determining when to update a power supply configuration.

The determination of whether and how to reconfigure the ET power supply 220 may depend on factors in addition to the new performance requirements received from the network controller 150. Accordingly, the logic 700 may be extended as shown in FIG. 11, which shows an additional example of logic 1100 for power supply reconfiguration. The logic 1100 receives performance requirements from the network controller (1102), and also determines specific characteristics of the performance requirements, such as transmit/receive center frequencies, transmit/receive bandwidths, required spectral masks, and other characteristics (1104). In addition, the logic 1100 determines the characteristics of other communication channels (e.g., by reference to a table of commonly used communication bands) (1106). Thus, the logic 1100 may determine, for instance, the center frequency and bandwidth of public safety bands, emergency bands, or other communication bands.

In some instances, the performance requirements specify a transmit band for the UE 100 that is farther than a proximity threshold from the other communication channels (1108). In such situations, the logic 1100 may search for a new ET configuration that is responsive to the performance requirements received from the network controller 150 (1110). The logic 1100 may then implement the new ET configuration (1112).

In other instances, however, the performance requirements specify a transmit band for the UE 100 that is within a proximity threshold of other communication channels (1108). Examples of other communication channels include public safety bands and emergency bands in use by other systems. The other communication channels may also include any receive band currently in use by the UE 100.

In such situations, the logic 1100 may determine whether to guard against interference or other undesired effects with the other communication channels (1114). If not, the logic 11100 may search for (1110) and implement (1112) a new ET configuration as noted above. If so, then the logic 1100 may still search for a new ET configuration responsive to the performance requirements (1116), but may also adjust the new ET configuration to guard against the undesired effects (1118).

To that end, the logic 1100 may modify the ET configuration to provide excess capability for transmissions in the transmit band specified for the UE 100. The ET configuration may provide excess capability, for example, by providing extra headroom (headroom beyond that ordinarily supplied) for the power supply signal provided to the PA 206. As another example, the ET configuration may provide additional current supply capability for the power supply signal.

Said another way, the distance between transmit bands and receive bands depends on where the allocation is located. Where the transmit to receive spacing is close, it may be advantages to change the tuning parameters of the ET power supply 220 to minimize receive band interference. For example, when transmit/receive spacing is close, or when the transmit signal includes frequencies that are near the receive band, then the logic 1100 may increase the headroom, linearity, switching frequencies, or other aspects of the ET power supply 220, to provide extra capability for the PA 206 to drive the transmit signal. Doing so may prevent the transmit signal from interfering with the receive band, such as by desensitizing the receiver. However, when the transmit/receive bands are sufficiently far apart, the logic 1100 may instead relax the headroom, linearity, or other operational characteristics of the ET power supply 220 because more distortion would not necessarily impact any receive band.

As explained above, the additional capability may be provided with respect to the UE's own transmit and receive bands, or may be provided in reference to other bands used by other systems. Accordingly, the ET power supply 220 may facilitate tight spectral mask margins for public safety bands. As another example, the ET power supply 220 may facilitate maintaining tight mask margins for other radio technologies in the UE 100 itself, such as Bluetooth radios, WiFi (or a harmonic that would fall into a WiFi band), Global Positioning System (GPS) bands, or other bands.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
   a memory operable to store:
      a first power supply configuration; and
      a second power supply configuration;
   a power supply communication interface; and
   circuitry in communication with the memory and the power supply communication interface, the circuitry configured to:
      receive, via a wireless network, a transmit channel bandwidth control message from a control station of the wireless network;
      responsive to the transmit channel bandwidth control message,
      determine a transmit channel bandwidth for communicating over the wireless network;
      determine a selected power supply configuration from among the first power supply configuration and the second power supply configuration by determining which of the first power supply configuration and the second power supply configuration is more energy efficient for communicating using the transmit channel bandwidth; and
      communicate the selected power supply configuration over the power supply communication interface.

2. The system of claim 1, where the power supply communication interface comprises:
   an envelope tracking power supply communication interface.

3. The system of claim 2, where the selected power supply configuration comprises a switching frequency indicator.

4. The system of claim 1, where the selected power supply configuration is operable to cause an envelope tracking power supply to operate as a function of a bandwidth allocation from the control station.

5. The system of claim 1, where:
the selected power supply configuration is operable to cause an envelope tracking power supply to operate as a function of:
the transmit band allocated by the control station; and
a relationship of the transmit band to a receive band.

6. The system of claim 5, where the:
the receive band comprises a public safety band; and
the relationship comprises proximity of the transmit band to the receive band.

7. The system of claim 6, where selected power supply configuration is further operable to cause the envelope tracking power supply to provide excess capability for transmissions in the transmit band.

8. The system of claim 1, where the circuitry is further configured to receive an operational parameter control message comprising an output power level.

9. The system of claim 1, where the selected power supply configuration is configured to cause an envelope tracking power supply to:
receive envelope tracking signals; and
output a power supply voltage signal that approximates a signal envelope.

10. The system of claim 1, where the circuitry is further configured to:
apply, responsive to the transmit channel bandwidth control message, the transmit channel bandwidth during an upcoming subframe of a current communication frame.

11. A method comprising:
by circuitry in communication with a power supply communication interface:
receiving, via a wireless network, a frequency control message from a control station of the wireless network;
responsive to the frequency control message, determining a frequency assignment for communication over the wireless network;
transmitting first information in a current subframe of a larger communication frame;
determining, responsive to the frequency assignment, a selected power supply configuration from among a first power supply configuration and a second power supply configuration; and
communicating the selected power supply configuration over the power supply communication interface; and
where determining the frequency assignment comprises determining, responsive to the frequency control message, a bandwidth avocation applicable for a subsequent subframe that follows the current subframe.

12. The method of claim 11, where:
determining the bandwidth allocation comprises determining a transmit band; and
where the method further comprises:
determining proximity of the transmit band to a receive band; and
when the proximity is less than a proximity threshold, determining the selected power supply configuration to provide excess capability for transmissions in the transmit band.

13. The method of claim 12, where determining proximity of the transmit band to the receive band comprises:
determining proximity of the transmit band to a public safety receive band.

14. The method of claim 12, where determining proximity of the transmit band to the receive band comprises:
determining proximity of the transmit band to a receive band allocated to a wireless transceiver.

15. The method of claim 11, further comprising receiving an operational parameter control message comprising a center frequency assignment, an output power level, or both.

16. The method of claim 11, where determining the selected power supply configuration comprises determining a switching frequency indicator.

17. A system comprising:
a memory configured to store multiple power supply configurations;
an envelope tracking power supply configured to:
receive envelope tracking signals; and
output a power supply voltage signal that approximates a signal envelope; a power amplifier configured to receive the power supply voltage signal and drive an antenna with a current transmit signal characterized by a current bandwidth; and circuitry coupled to the power amplifier via a power supply communication interface, the circuitry configured to:
receive through the antenna a bandwidth allocation message from a network controller;
responsive to the bandwidth allocation message, determine a new bandwidth over which to transmit through the antenna;
determine, from among the multiple power supply configurations, a selected power supply configuration for the new bandwidth;
communicate the selected power supply configuration over the power supply communication interface; and
cause the power amplifier to drive the antenna with a new transmit signal characterized by the new bandwidth.

18. The system of claim 17, where the selected power supply configuration comprises a switching frequency operating parameter for the envelope tracking power supply.

19. The system of claim 17, where the circuitry is configured to determine the new bandwidth by:
determining proximity of a transmit band to a receive band; and
when the proximity is less than a proximity threshold, determining the selected power supply configuration to provide excess capability for transmissions in the transmit band.

20. The system of claim 19, where the circuitry is configured to determine proximity of the transmit band to the receive band by:
determining proximity of the transmit band to a public safety receive band.

* * * * *